J. V. RIGSBY & W. H. ROYAL.
FLY TRAP.
APPLICATION FILED JULY 15, 1911.
1,026,222.
Patented May 14, 1912.
2 SHEETS—SHEET 1.
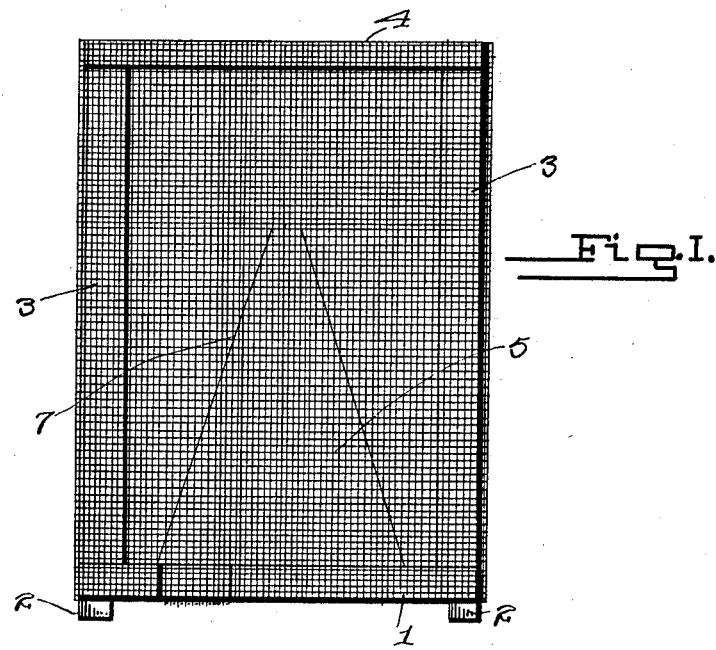
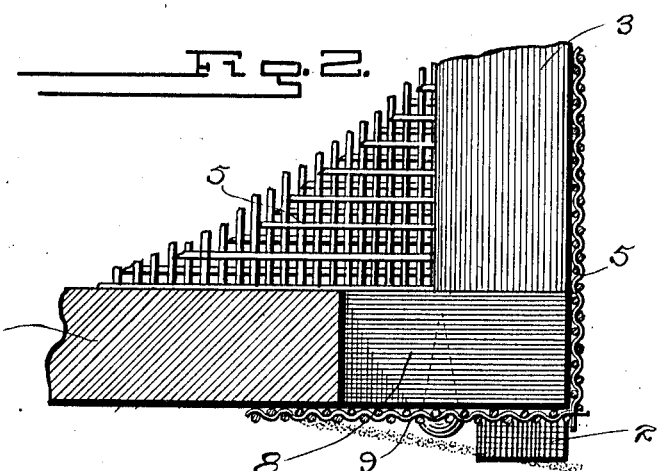
William H. Royal.
James V. Rigsby.
INVENTORS J. V. RIGSBY & W. H. ROYAL.
FLY TRAP.
APPLICATION FILED JULY 15, 1911.
1,026,222.
Patented May 14, 1912.
2 SHEETS—SHEET 2.
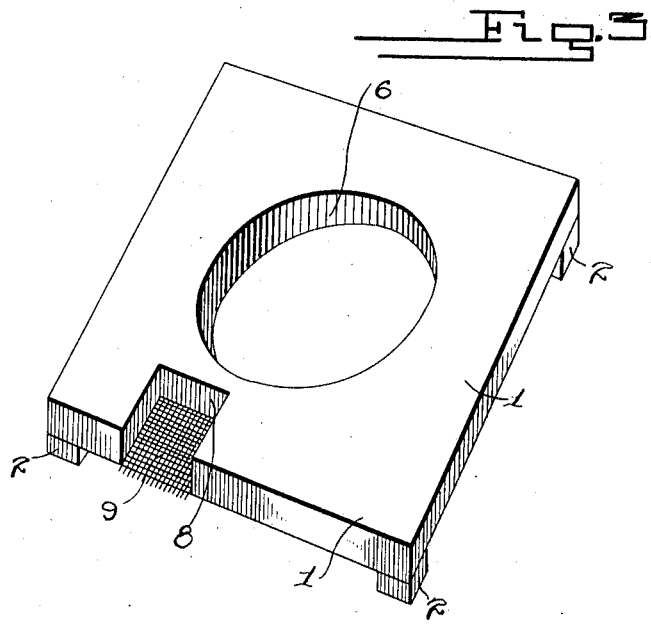
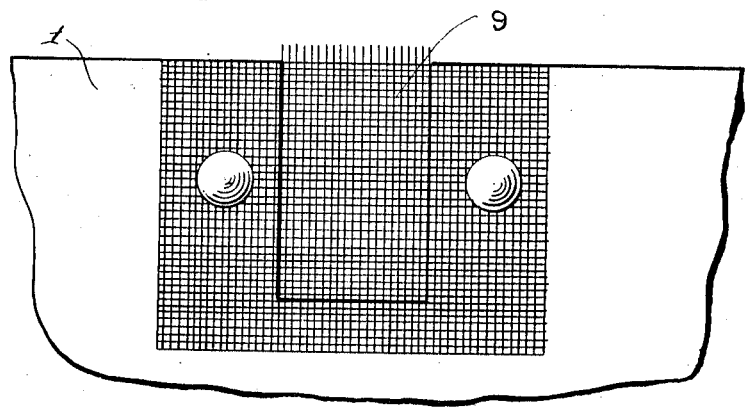
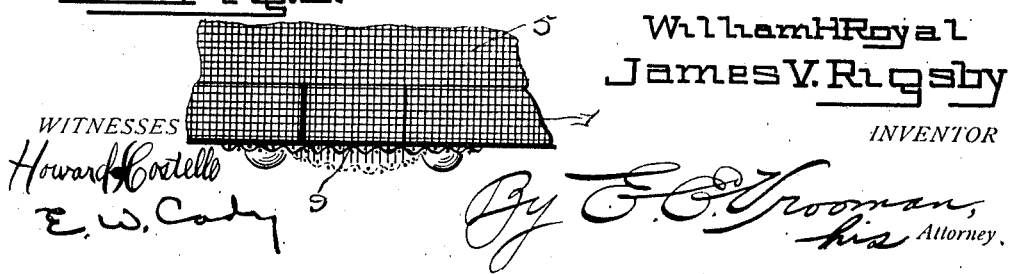
WITNESSES
Howard Costello
E. W. Cady
William H Royal
James V. Rigsby
INVENTOR
By G. E. Trooman,
his Attorney.

UNITED STATES PATENT OFFICE.

JAMES V. RIGSBY AND WILLIAM H. ROYAL, OF MACOMB, MISSOURI.

FLY-TRAP.

1,026,222.  Specification of Letters Patent.  Patented May 14, 1912.

Application filed July 15, 1911. Serial No. 638,677.

*To all whom it may concern:*

Be it known that we, JAMES V. RIGSBY and WILLIAM H. ROYAL, citizens of the United States, residing at Macomb, in the county of Wright and State of Missouri, have invented certain new and useful Improvements in Fly-Traps, of which the following is a specification, reference being had therein to the accompanying drawing.

This invention relates to fly traps and has especial reference to that class of fly traps which are formed of reticulated material and provided with an entrance passageway by means of which flies may enter the trap and be prevented from escaping therefrom.

The invention has for its object to provide an improved fly trap of this kind constructed and arranged as hereinafter set forth and claimed.

Referring to the accompanying drawings:—Figure 1 is a view in elevation of a fly trap constructed in accordance with this invention. Fig. 2 is an enlarged detail view in vertical section of a portion of the trap adjacent to one corner. Fig. 3 is a detail view in perspective of the bottom of the trap. Fig. 4 is an enlarged detail plan view of a portion of the bottom of the trap looking at the underside thereof. Fig. 5 is a detail view of a portion of the lower end of the trap showing the construction by means of which dead flies may be removed.

The trap is constructed preferably with a solid bottom 1, consisting of a rectangular piece of wood provided at each corner with a block or support 2, whereby the bottom 1 is slightly elevated from the table or other support on which it is placed. Mounted on each corner of the bottom 1 is a wooden post 3 and on the top of the posts 3 is mounted and secured a preferably solid top 4 formed of wood. The sides of the trap are formed of reticulated material 5 such as wire gauze, and are secured to the bottom and top and the posts in any suitable manner. The bottom 1 is formed with a circular opening 6 over which is mounted a cone 7 of wire gauze open at the top and bottom and secured to the bottom 1 in any suitable manner. By means of this construction flies attracted toward the interior of the trap, which may be baited if desired, crawl up on the inner side of the cone 7 and through the opening in its top and are thereby imprisoned within the trap and do not return through the opening in the top of the cone. When a quantity of flies have accumulated in the trap they may be drowned by immerging the trap in water, the dead bodies of the flies being collected in the space formed between the bottom of the cone 7 and the walls of the trap. In order to remove the dead bodies of the flies means for that purpose is provided and, as here shown, preferably consisting of a rectangular opening 8 in the bottom 1 having an open end in the edge of the bottom 1 over which the netting 5 extends and slightly below the same. Extending across the bottom of the opening 8 and projecting slightly beyond the same as shown in Figs. 3 and 4 is a strip of wire gauze 9 secured at its inner end to the bottom of the trap and projecting slightly beyond the sides of the bottom as shown in Fig. 3 and engaging the lower edge of the side wall of the trap as shown in Fig. 2. The strip of wire gauze 9 is secured only at its inner end to the bottom 1 and is flexible and may be pushed down with the finger to form an opening between the lower edge of the wire gauze extending down the side of the trap and the end of the opening 8. By means of this construction a quantity of dead flies in the bottom of the trap may be shaken over to the rectangular opening 8 and discharged from the trap by holding down the strip of wire gauze 9 away from the lower edge of the wire gauze forming the side of the trap.

What we claim is:—

A fly trap having a solid bottom with an opening therein, and a second opening adjacent to one edge of the bottom, wire gauze inclosing said trap, a cone of wire gauze open at each end and mounted over the opening in the bottom of the trap, said bottom also having a rectangular opening at one edge thereof, the wire gauze of the side adjacent to said opening projecting below the outer end of the opening, and a flexible strip of wire gauze covering the bottom of said opening, and having its outer end engaging the lower edge of the wire gauze of the adjacent side of the trap.

In testimony whereof we hereunto affix our signatures in presence of two witnesses.

JAMES V. RIGSBY.
WILLIAM H. ROYAL.

Witnesses:
H. D. NORCROSS,
W. T. NORCROSS.

Copies of this patent may be obtained for five cents each, by addressing the "Commissioner of Patents, Washington, D. C."